US012560292B2

(12) United States Patent
She

(10) Patent No.: US 12,560,292 B2
(45) Date of Patent: *Feb. 24, 2026

(54) ELECTRONIC CANDLE

(71) Applicant: Dongguan Shuiquanzi Industrial Co., Ltd., Guangdong (CN)

(72) Inventor: Huilin She, Guangdong (CN)

(73) Assignee: Dongguan Shuiquanzi Industrial Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/280,299

(22) Filed: Jul. 25, 2025

(65) Prior Publication Data

US 2025/0347397 A1 Nov. 13, 2025

Related U.S. Application Data

(63) Continuation of application No. 18/790,422, filed on Jul. 31, 2024, now Pat. No. 12,392,464.

(30) Foreign Application Priority Data

Aug. 4, 2023 (CN) ......................... 202310978490.1
Aug. 4, 2023 (CN) ......................... 202322091015.0

(51) Int. Cl.

| | |
|---|---|
| ***F21S 10/04*** | (2006.01) |
| ***F21S 4/10*** | (2016.01) |
| ***F21S 6/00*** | (2006.01) |
| ***F21S 9/02*** | (2006.01) |
| ***F21V 17/12*** | (2006.01) |
| ***F21V 23/04*** | (2006.01) |
| *F21Y 107/30* | (2016.01) |
| *F21Y 113/00* | (2016.01) |
| *F21Y 115/10* | (2016.01) |

(52) U.S. Cl.

CPC ............... *F21S 10/043* (2013.01); *F21S 4/10* (2016.01); *F21S 6/001* (2013.01); *F21S 9/02* (2013.01); *F21V 17/12* (2013.01); *F21V 23/04* (2013.01); *F21Y 2107/30* (2016.08); *F21Y 2113/00* (2013.01); *F21Y 2115/10* (2016.08)

(58) Field of Classification Search

CPC .. F21S 10/043; F21S 4/10; F21S 6/001; F21S 9/02; F21V 17/12; F21V 23/04; F21Y 2107/30; F21Y 2115/10; F21Y 2113/00

See application file for complete search history.

(56) References Cited

U.S. PATENT DOCUMENTS 12,392,464 B2 * 8/2025 She ....................... F21S 10/043
2003/0081420 A1 * 5/2003 Jensen ...................... F21S 9/02
362/190

* cited by examiner

*Primary Examiner* — Bao Q Truong

(57) ABSTRACT

An electronic candle includes: a wax tube, a battery compartment, and a PCBA board. The wax tube is cylindrical and made from paraffin wax. The wax tube defines a cavity therein and has a first end and a second end, the second end defines an opening communicated to the cavity. The battery compartment is inserted into the cavity from the second end, the battery compartment has a third end and a fourth end, the fourth end defines an opening facing towards the first end. The PCBA board is inserted to the fourth end. The PCBA board is elongated. A maximum width of the PCBA board is in an interference fit with an inner diameter of the battery compartment, enabling the PCBA board to be snapped with the battery compartment.

20 Claims, 12 Drawing Sheets

ELECTRONIC CANDLE

CROSS REFERENCE TO RELATED APPLICATIONS

The present application is a continuation application of the U.S. application Ser. No. 18/790,422, filed on Jul. 31, 2024. U.S. application Ser. No. 18/790,422 claims priorities of the Chinese patent application No. 202322091015.0, filed on Aug. 4, 2023 and the Chinese patent application No. 202310978490.1, filed on Aug. 4, 2023. The disclosure of which is hereby incorporated by reference in their entireties.

TECHNICAL FIELD

The present disclosure relates to electronic candles, and in particular, relating to an electronic candle.

BACKGROUND

An electronic candle does not generate smoke and is safe and has a long service life, therefore, the electronic candle is used to replace traditional candles in various situations. In order to imitate texture of a real wax candle, paraffin wax is used to make a candle tube of the electronic candle. Since the wax candle tube is thin and long, the wax candle tube may not be easily molded independently and may not have sufficient strength to be assembled with a core assembly. Therefore, for the electronic candle in the art, the core assembly is directly placed into a waxing mold, and wax is poured for molding. A paraffin wax layer is solidified to and combined with a surface of the core assembly. In this case, a PCBA board in the core assembly is completely wrapped. When a string of lights needs to be arranged to wrap an outside surface of electronic candle, the string of lights cannot be electrically connected to the PCBA board, such that the string of lights cannot be arranged.

SUMMARY OF THE DISCLOSURE

In a first aspect, the present disclosure provides an electronic candle including: a wax tube, a battery compartment, and a PCBA board. The wax tube is cylindrical and made from paraffin wax. An axial length of the wax tube is 6-15 inches, a diameter of the wax tube is 19 mm-25 mm. The wax tube defines a cavity at an interior thereof, the wax tube has a first end and a second end, the second end defines an opening communicated to the cavity. The battery compartment is tubular. The battery compartment is inserted into the cavity from the second end, the battery compartment has a third end and a fourth end, the fourth end defines an opening facing towards the first end of the wax tube. The PCBA board is inserted to the fourth end of the battery compartment. At least a portion of the PCBA board is exposed to the cavity of the wax tube. The PCBA board is elongated. A maximum width of the PCBA board is in an interference fit with an inner diameter of the battery compartment, enabling the PCBA board to be snapped with the battery compartment.

In a second aspect, the present disclosure provides an electronic candle including: a wax tube, a battery compartment, a PCBA board, and an end cap. The wax tube is cylindrical and made from paraffin wax. An axial length of the wax tube is 6-15 inches, a diameter of the wax tube is 19 mm-25 mm. The wax tube defines a cavity at an interior thereof, the wax tube has a first end and a second end, the second end defines an opening communicated to the cavity.

The battery compartment is tubular. The battery compartment is inserted into the cavity from the second end, the battery compartment has a third end and a fourth end, the fourth end defines an opening facing towards the first end of the wax tube. The PCBA board is inserted to the fourth end of the battery compartment. At least a portion of the PCBA board is exposed to the cavity of the wax tube. The third end of the battery compartment is convex to form a connection structure. The connection structure includes an abutting surface. The abutting surface abuts against an end surface of the second end of the wax tube. The connection structure is exposed out of the wax tube. The end cap is connected to the connection structure.

DETAILED DESCRIPTION

Figure 1:
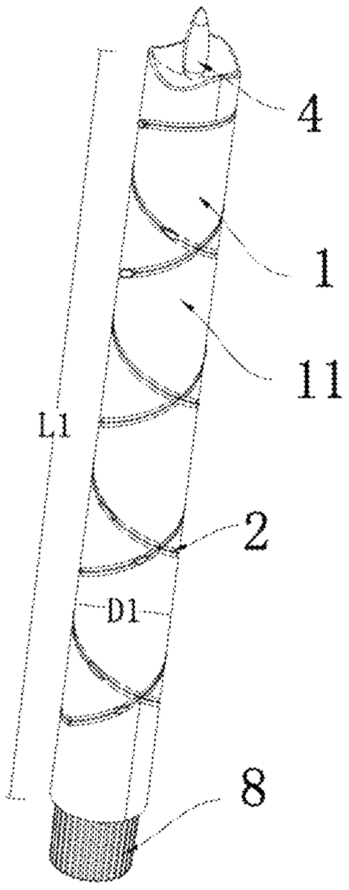
FIG. 1 is a structural schematic view I of an electronic candle according to an embodiment of the present disclosure.

In order to make the purposes, features and advantages of the present disclosure more obvious and understandable, specific embodiments of the present disclosure will be described in detail by referring to the accompanying drawings.

To be noted that the terms "first", "second", and so on, in the specification, claims, and drawings of the present disclosure are used to distinguish similar objects and shall not be interpreted as describing a particular order or sequence. It is understood that the used data may be interchanged, when appropriate, such that embodiments of the present application described herein can be practiced in an order other than those illustrated or described herein.

Unless otherwise expressly specified and qualified, in the description of the present disclosure, the terms "arranged", "mounted", "connected", "coupled" shall be understood in a broad sense. For example, connection may be fixed connection, removable connection; or connected to form a one-piece structure; mechanical connection; direct connection, indirect connection through an intermediate medium; or connection internally between two elements. For any ordinary skilled person in the art, specific meanings of the above terms in the present disclosure shall be understood case by case.

In the description of this specification, reference to the terms “embodiments”, “an embodiment”, and “one embodiment” means that the specific features, structures, materials, or properties described in the embodiment or implementation are included in at least one embodiment or implementation of the present disclosure. In the present specification, expressions of the above terms do not necessarily refer to a same embodiment or implementation. Moreover, the specific features, structures, materials, or properties described may be combined in any one or more of the embodiments or implementations in a suitable manner.

The present disclosure is described in detail below by referring to the accompanying drawings.

In order to solve the above technical problems, as shown in FIGS. 1, 2, 3 and 4, embodiments of the present disclosure provide an electronic candle, including following components.

A wax tube 1 is a cylindrical structure made from paraffin wax material. An axial length L1 of the wax tube 1 is 6-15 inches, and a diameter D1 of the wax tube 1 is 19 mm-25 mm. The wax tube 1 defines a cavity 12 at an interior thereof. The wax tube 1 has a first end 13 and a second end 14. The second end 14 has an opening communicated to the cavity 12.

A battery compartment 32 is arranged and is tubular. The battery compartment 32 is inserted into the cavity 12 from the second end 14. The battery compartment 32 has a third end 322 and a fourth end 321. The fourth end 321 has an opening facing towards the first end 13 of the wax tube 1.

A PCBA board 31 is inserted to the fourth end 321 of the battery compartment 32, and at least a portion of the PCBA board 31 is exposed to the cavity 12 of the wax tube.

A light string 2 is extending spirally to be arranged on an outer surface 11 of the wax tube 1. The light string 2 extends through the wax tube 1 to be electrically connected to the exposed portion of the PCBA board 31.

To be noted that, the wax tube 1 is made from paraffin wax material, having the axial length L1 of 6-15 inches and the diameter D1 of 19 mm-25 mm. In this sway, the wax tube 1 is thin and long, having a structure similar to a shape of a real candle. The wax tube 1 defines the cavity 12 at the interior thereof. In some embodiments, the cavity 12 is a cylindrical cavity coaxial with the wax tube 1, such that the wax tube 1 is cylindrical having the closed first end 12 and the opened second end 14. In this way, a space is provided to enable the PCBA board 31 to be electrically connected to the light string 2. The battery compartment 32 is tubular. In some embodiments, the battery compartment 32 is a circular tubular structure having openings at both the third end 322 and the fourth end 321. The battery compartment 32 is inserted into the wax tube 1 from the second end 14 of the wax tube 1, such that a space inside the wax tube 1 is saved as much space as possible, facilitating the diameter D1 of the wax tube 1 to be reduced. The fourth end 321 of the battery compartment 32 faces towards the first end 12 of the wax tube 1. The PCBA board 31 is inserted to the fourth end 321 of the battery compartment 32 to be disposed close to the first end 13 of the wax tube 1. In this way, subsequent electrical connection with light beads 5 may be achieved easily. In addition, at least a portion of the PCBA board 31 is exposed to out of the battery compartment 32, facilitating a connection end of the light string 2 to extend through the wax tube 1 to be electrically connected with the PCBA board 31. In this way, the light string 2 can be arranged and lit up, such that the electronic candle may emit light more splendidly, meeting preferences of consumers.

Figure 2:
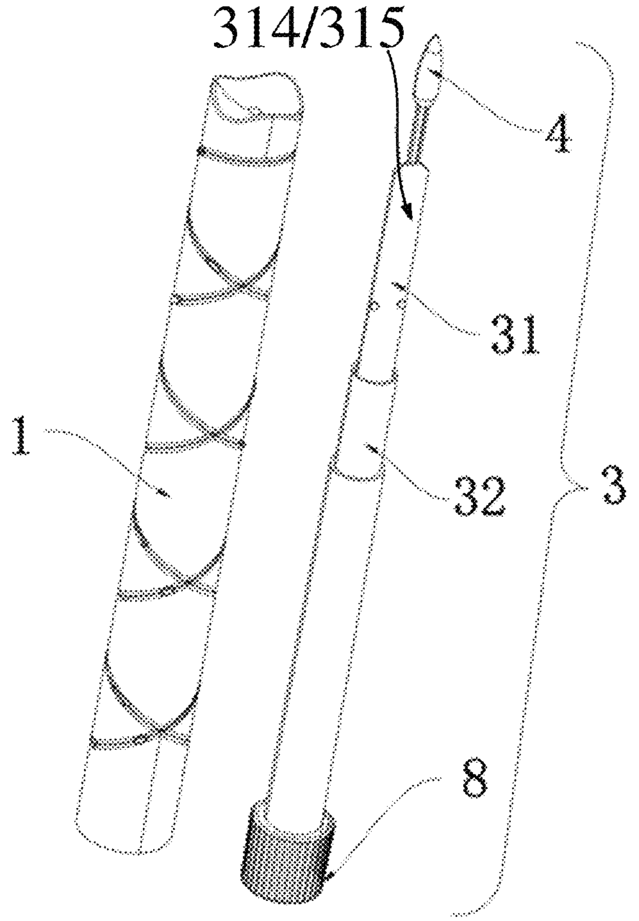
FIG. 2 is an exploded view of a portion of the electronic candle according to an embodiment of the present disclosure.
Figure 3:
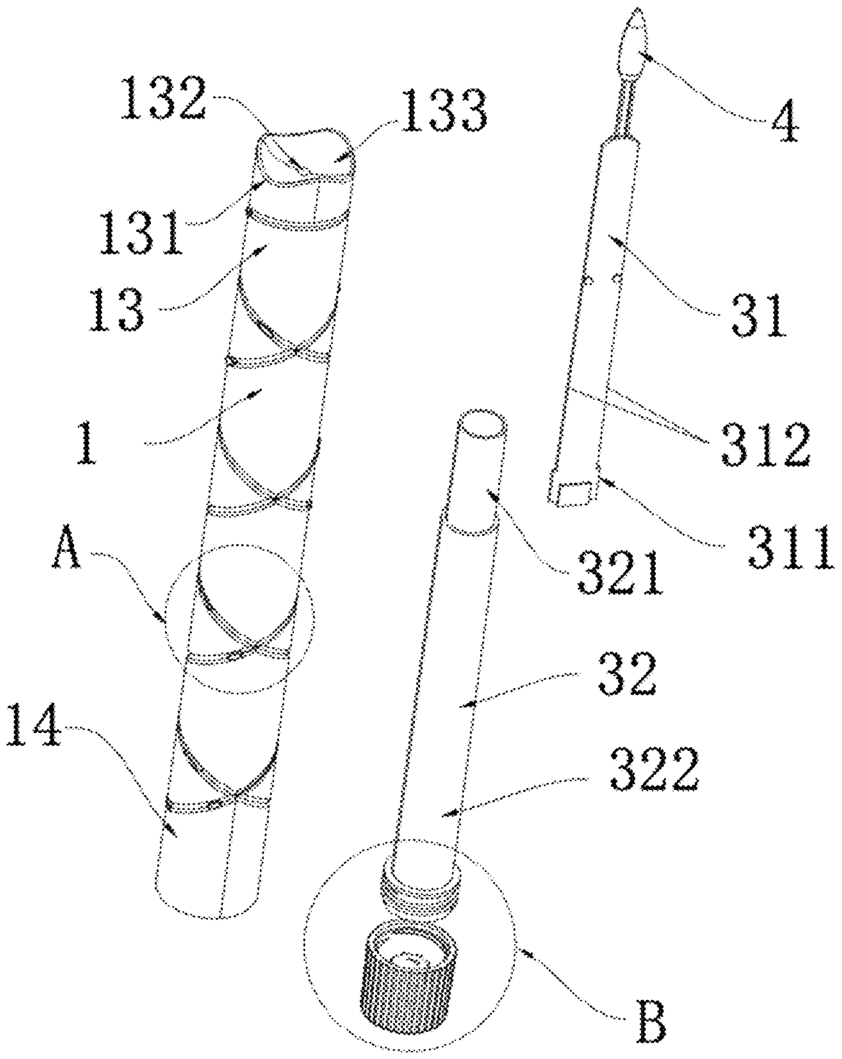
FIG. 3 is an exploded view I of the electronic candle according to an embodiment of the present disclosure.
Figure 4:
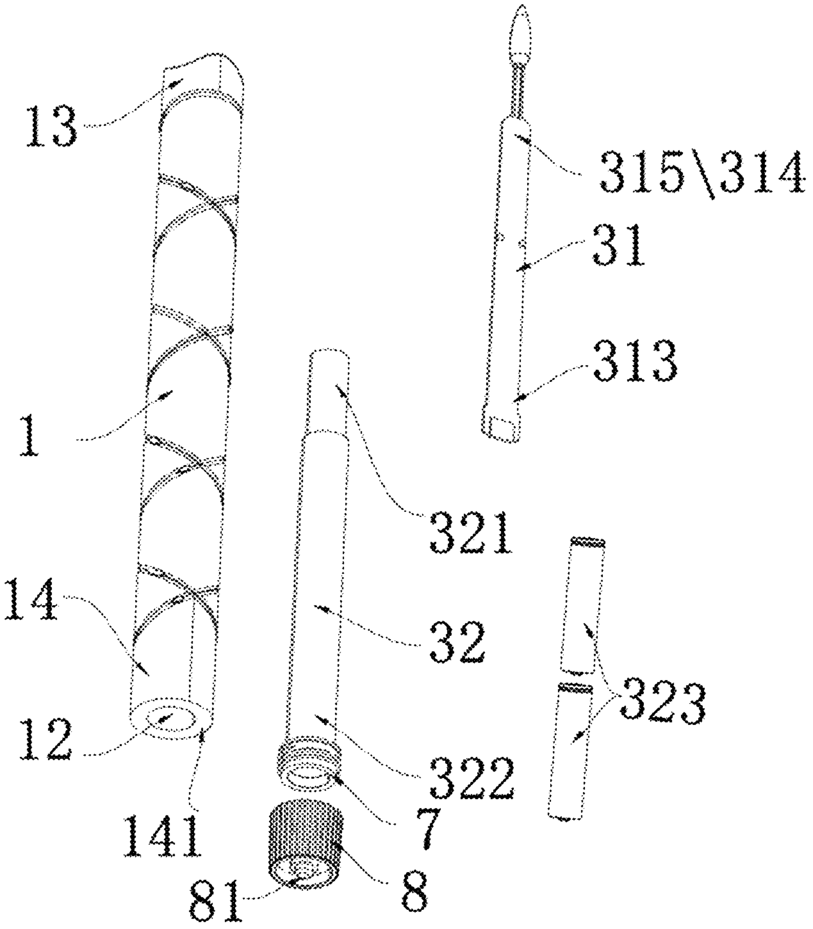
FIG. 4 is an exploded view II of the electronic candle according to an embodiment of the present disclosure.

In an embodiment, as shown in FIGS. 2, 3, and 4, the PCBA board 31 is elongated. A maximum width of the PCBA board 31 is in an interference fit with an inner diameter of the battery compartment 32, enabling the PCBA board 31 to be snapped into the battery compartment 32.

To be noted that, in some embodiments, the PCBA board 31 is elongated in shape to fully utilize the internal space of the wax tube 1. The elongated PCBA board 31 provides a larger surface area to allow electronic components to be arranged thereon. In some embodiments, the battery compartment 32 is circular cylindrical in shape. Each of two sides 312 of the PCBA board 31, along a transverse direction, is arranged with a bump 311, such that the maximum width is formed. The portion of the PCBA board 31 having the maximum width is in interference fit with the inner diameter of the battery compartment 32. An end of the PCBA board 31 near the battery compartment 32 is a fifth end 313. The fifth end 313 is inserted in the fourth end 321 of the battery compartment 32, such that the PCBA board 31 is secured. It is understood that a depth that the PCBA board 31 is inserted into the battery compartment 32 may also be adjustable as required to ensure the light beads 5 to be located at a suitable position after passing through a through hole 132.

Figure 5:
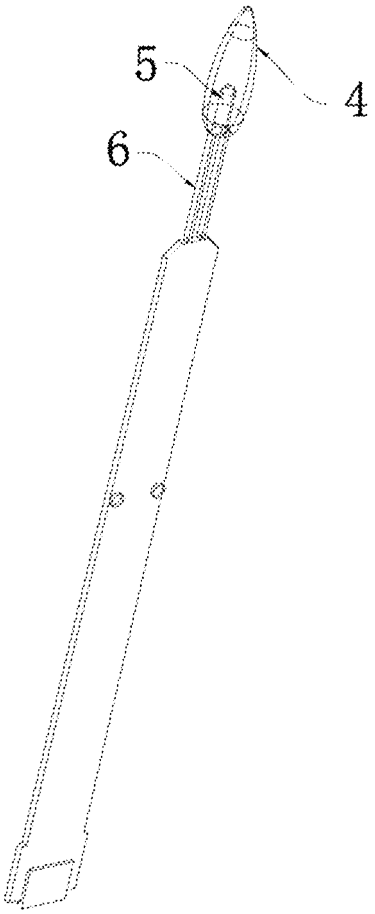
FIG. 5 is a perspective view of a portion of the electronic candle according to an embodiment of the present disclosure.

In an embodiment, as shown in FIGS. 4 and 5, an end 314 of the PCBA board 31 away from the battery compartment 32 is connected with the light bead 5. An end face 133 of the first end 13 of the wax tube 1 defines the through hole 132. The light bead 5 passes through the through hole 132 to be exposed.

To be noted that the end 314 of the PCBA board 31 away from the battery compartment 32 is a sixth end 315. The light bead 5 is provided on the sixth end 315 of the PCBA board 31 by a lead wire 6. The light bead 5 passes through the through hole 132 at the first end 13 of the wax tube 1. The through hole 132 is defined in a center of the end face 133 of the first end 13. The light bead 5 passes through the through hole and is exposed. The light bead 5, when being lit up, can mimic a flame of the real candle.

In an embodiment, as shown in FIG. 3, the electronic candle further includes a battery 323. The battery 323 is received in the battery compartment 32 and is coaxially arranged with the battery compartment 32. The battery 323 and the light string 2 are electrically connected to the PCBA board 31.

To be noted that the battery 323 is received in the battery compartment 32. In some embodiments, two batteries 323 are arranged and are distributed along an axial direction the battery compartment 32, such that the two batteries 323 are coaxial with the battery compartment 32. The batteries 323 are electrically connected to the PCBA board 31. The PCBA board 31 is electrically connected to and supply power to the light string 2 and the light bead 5. The PCBA board 31 may control switching, timing and a lighting mode of the light string 2 and the light bead 5.

In an embodiment, as shown in FIG. 5, the electronic candle further includes a light bead sleeve 4, which is light transmissive. The light bead sleeve 4 sleeves the light bead 5. The light bead sleeve 4 is conical, having a shape similar to the flame.

To be noted that, in some embodiments, the light bead sleeve 4 is made of white soft silicone, which allows light to pass through but is non-transparent, and the light bead sleeve 4 has the shape similar to the flame. The light bead sleeve 4 sleeves the light bead 5 and is configured to blur graininess of the light bead 5, such that the passing through the light bead cover is softer and is similar to light of the flame when the real candle is burning. When the light from the light bead 5 lights up the light bead sleeve, the light bead sleeve imitates the shape of the flame when the real candle is burning. Therefore, simulation is achieved.

In an embodiment, as shown in FIG. 5, the light emitted from the light bead 5 is warm white light, similar to the flame.

To be noted that, in some embodiments, the light emitted from the light bead 5 is warm white light, similar to the flame, such that a color of the flame when the real candle is burning can be ideally simulated.

In an embodiment, as shown in FIG. 3, an edge 131 of the opening of the first end 13 of the wax tube 1 is wavy, flat or inclined.

To be noted that, the edge 131 of the opening of the first end 13 of the wax tube 1 may be arranged to simulate various states of the real candle. For example, the flat edge simulates the real candle that is not burning. Alternatively, the irregular wavy edge simulates the real candle that has been burned for a period of time. Alternatively, the inclined edge simulates the real candle that has been burned for a period of time forming a higher side and a lower side. It is understood that the shape of the edge 131 at the first end of the wax tube 1 may be arranged in other shapes to simulate other shapes of the real candle that is burning, such that simulation is ideal, and the electronic candle is more design-oriented.

Figure 6:
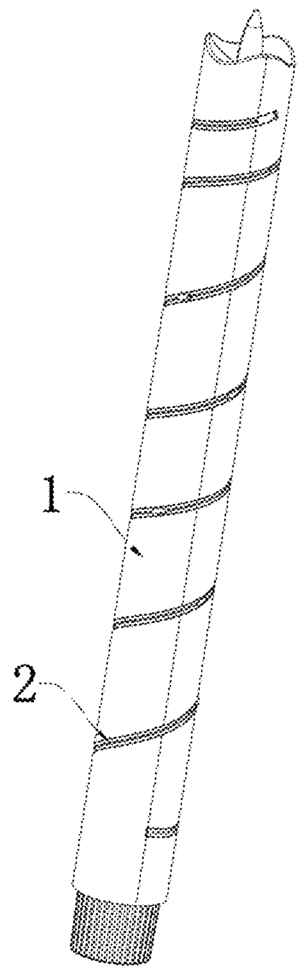
FIG. 6 is a structural schematic view II of the electronic candle according to an embodiment of the present disclosure.

In an embodiment, as shown in FIGS. 3 and 6, the light string 2 is extending to form a crossing pattern and winds along the axial direction of the wax tube 1, and is disposed on the outer surface 11 of the wax tube 1.

To be noted that the light string 2 includes a light wire 21 and LEDs 22, and the light wire 21 is configured to space the LEDs 22 to be apart from each other. The light string 2 has two ends. One of the two ends is the connection end, and the other end of the two ends is a winding end. In an embodiment, the connection end of the light string 2 extends through the wax tube 1 to be electrically connected to the PCBA board 31, such that the light string 2 is electrically illuminated. The other end of the light string 2 is arranged crosswise along the axial direction of the wax tube 1 until the light string 2 completely wraps around the wax tube 1.

Figure 7:
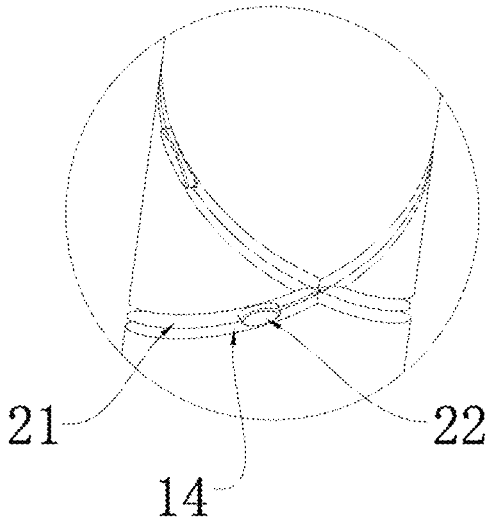
FIG. 7 is an enlarged view of a portion A shown in FIG. 3.

In an embodiment, as shown in FIG. 7, the light string 2 is arranged spirally, winding along the axial direction of the wax tube 1 on the outer surface 11 of the wax tube 1.

To be noted that, in another embodiment, the connection end of the light string 2 extends through the wax tube 1 to be electrically connected to the PCBA board 31 to be electrically illuminated. The other end of the light string 2 is extending spirally along the axial direction of the wax tube 1, such that a parallel pattern is formed, until the light string 2 completely wraps around the wax tube 1. It is understood that the light string 2 may be extending in other manners according to preferences of the user to achieve a desired lighting effect.

In an embodiment, as shown in FIG. 7, the wax tube 1 defines a receiving groove 21. An extending shape of the receiving groove 21 matches with an extending path of the light string 2 to receive the light string 2.

To be noted that, in some embodiments, the wax tube 1 defines the receiving groove 21. The receiving groove 21 is an elongated shallow groove defined in the outer surface 11 of the wax tube 1. The receiving groove 21 is configured to receive the light string 2. In this way, the light string 2 is prevented from shifting, and the light string 2 and the outer surface 11 of the wax tube 1 cooperatively form a plane. Therefore, the electronic candle is overall beautiful. In addition, the receiving groove 21 covers a trace that the light string 2 extends through the wax tube 1, such that a seamless appearance is achieved.

Figure 8:
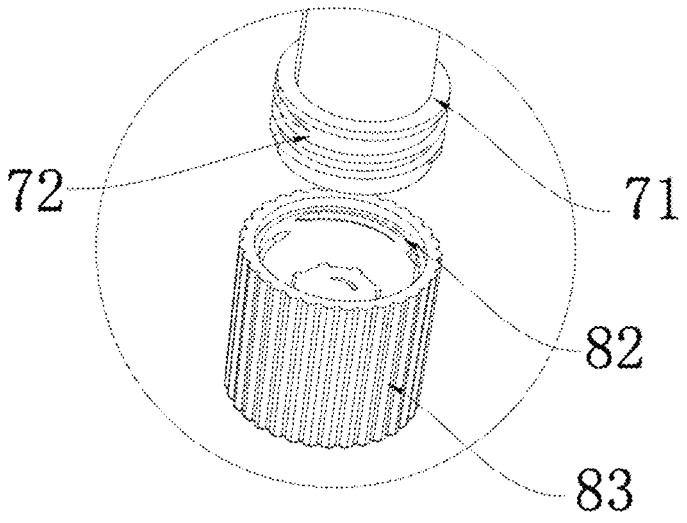
FIG. 8 is an enlarged view of a portion B shown in FIG. 3.

In an embodiment, as shown in FIGS. 4 and 8, the electronic candle further includes an end cap 8. The third end 322 of the battery compartment 32 is convex to form a connection structure 7. The connection structure 7 includes an abutting surface 71. The abutting surface 71 abuts against the end surface 141 of the second end 14 of the wax tube 1, enabling the connection structure 7 to be exposed out of the wax tube 1. The end cap 8 is connected to the connection structure 7.

To be noted that the connection structure 7 and the battery compartment 32 are configured as a one-piece and integral structure, or the connection structure 7 and the battery compartment 32 are separated structures. A diameter of the connection structure 7 is larger than the inner diameter of the cavity 12 of the wax tube 1. In this way, the abutting surface 71 is formed. The abutting surface 71 abuts against the end surface 141 of the second end 14 of the wax tube 1, such that the connection structure 7 is exposed. An outer surface of the connection structure 7 is arranged external threads 72. An inner surface of the end cap 8 is arranged internal threads 82. Therefore, the end cap 8 and the connection structure 7 are threadedly connected to each other.

In an embodiment, as shown in FIG. 4, the end cap 8 is arranged with a press switch 81 for controlling the light bead 5 and the light string 2 to be switched on and off.

To be noted that the end cap 8 is arranged with the press switch 81, the push switch 81 is electrically connected to the PCBA board 31, such that the PCBA board 31 controls the light bead 5 and the light string 2 to be switched on and off. In some embodiments, the press switch 81 is disposed on a bottom end of the end cap 8. An outer surface of the end cap 8 is arranged with a vertical stripe 83, such that the electronic candle can be inserted into a candlestick (not shown in the drawing).

In an embodiment, as shown in FIG. 2, the battery compartment 32 is a plastic member. The battery compartment 32 is assembled to the wax tube 1 by an adhesive.

To be noted that the battery compartment 32 is made from plastic, such that the battery compartment 32 may be easily shaped and have a certain tensile strength. Therefore, the PCBA board 31 can be easily inserted to the battery compartment 32 to be fixed. The adhesive may be glue, and the battery compartment 32 is attached and inserted in the wax tube 1. In order to prevent the battery compartment 32 from loosening, the glue may be applied between the battery compartment 32 and the wax tube 1, adhesive and fixation is achieved by the glue.

Figure 9:
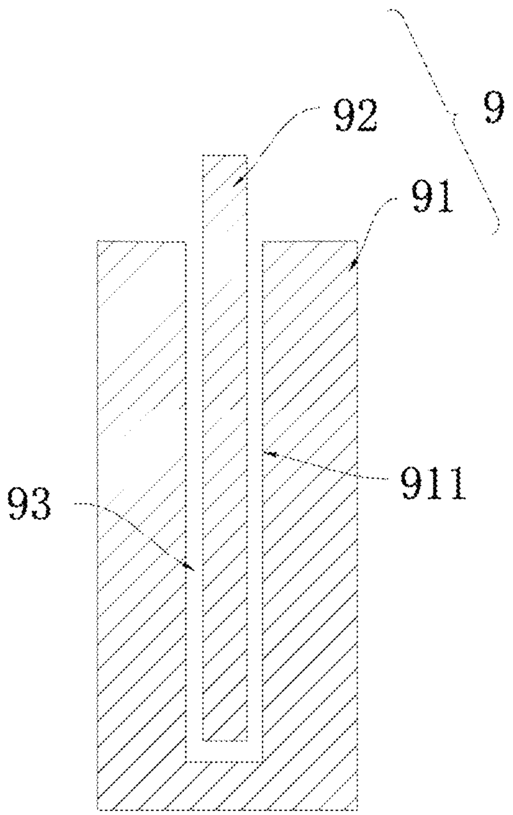
FIG. 9 is a cross-sectional view of a wax filling mold according to an embodiment of the present disclosure.

Embodiments of the present disclosure further provide a method of manufacturing the electronic candle as shown in FIGS. 2 and 9. The method includes following operations.

The wax tube 1 is manufactured by a wax filling mold 9. The wax filling mold 9 includes an outer mold 91 and an inner mold 92. The outer mold 91 has a cylindrical groove 911, and the inner mold 92 is rod-shaped. The inner mold 92 is vertically inserted in the groove 911. A gap 93 is defined between the inner mold 92 and an inner wall of the groove 911. A wax solution is poured into the gap 93. When the wax solution is solidified and is unable to flow, the inner mold 92 is removed. After the wax solution is completely shaped, the wax tube 1 is separated from the outer mold 91, and the wax tube 1 is obtained.

A core assembly 3 is assembled in the wax tube 1, and the light string 2 wraps around the outer surface 11 of the wax tube 1. The light string 2 extends through the wax tube 1 to be electrically connected to the core assembly 3.

To be noted that, the inner mold 92 is disposed above a bottom wall of the outer mold 91. The inner mold 92 is rod-shaped to be in conformity with the shape of the cavity 12 of the wax tube 1. The outer mold 91 has the cylindrical groove 911. The cylindrical groove 911 is configured to form the outer surface 11 of the wax tube 1 and the end surface 141 of the first end 13. The inner mold 92 is inserted vertically to an axial center of the groove 911 and leaves the gap 93 away from the wall of the groove 911. In this way, the wax tube 1 can be formed after pouring wax solution. When the wax solution starts to be solidified, the inner mold 92 is taken out. At this moment, the wax solution has certain plasticity, the wax tube 1 is prevented from being cracked due to shaking or being squeezed when the inner mold 92 is taken out. The wax tube 1 is molded individually firstly, and subsequently, assembled inside the wax the core assembly 3 is assembled to the inside of the wax tube 1. The technical solution in the art, in which the wax solution is poured for molding after the core assembly 3 is directly inserted into the wax filling mold 9, is changed. For the method in the art, the paraffin wax layer is solidified to and combined with the surface of the core assembly 3. By contrast, in the present method, the light string 2 can be arranged easily, and the core assembly 3 may not be damaged due to the wax solution being poured improperly, such that the overall cost is reduced significantly.

In an embodiment, as shown in FIGS. 2, 3 and 4, the wax tube 1 defines the cavity 12 therein and includes the first end 13 and the second end 14. The first end 13 is closed, and the second end 14 has the opening. The core assembly 3 includes the battery compartment 32, the elongated PCBA board 31, and the light bead 5. The battery compartment 32 is tubular. The battery compartment 32 includes the third end 322 and the fourth end 321, and each of the third end 322 and the fourth end 321 defines the opening.

The light bead 5 is soldered to the PCBA board 31, and then the PCBA board 31 is vertically inserted in the battery compartment 32. The light bead 5 is disposed at the end of the PCBA board 31 away from the battery compartment 32.

The battery compartment 32 is inserted into the wax tube 1 from the second end 14 of the wax tube 1 until the light bead 5 passes through and is exposed out of the wax tube 1 from the first end 13. At least a portion of the PCBA board 31 is exposed in the cavity 12.

The light string 2 extends through the wax tube 1 and is soldered to the exposed portion 311 of the PCBA board 31 to be electrically connected to the PCBA board 31.

To be noted that the battery compartment 32 is tubular. The PCBA board 31 is elongated. The PCBA board 31 is vertically inserted to the battery compartment 32, the end 314 of the PCBA board 31 away from the battery compartment 32 is soldered with the light bead 5. In this way, the battery compartment 32, the PCBA board 31 and the light bead 5 can be assembled to form an integral structure along the axial direction, and the integral structure is arranged into the wax tube 1 from the second end 14. In this way, the core assembly 3 is assembled in an open-ended manner, an assembling efficiency is greatly improved. After the assembling, at least a portion of the PCBA board 31 is exposed in the cavity 12, facilitating the light string 2 to be soldered.

In an embodiment, as shown in FIGS. 4 and 5, the core assembly 3 further includes the battery 323, the end cap 8, and the light bead sleeve 4 that is light transmissive.

The light bead sleeve 4 is taken to sleeve the light bead 5. The battery 323 is mounted from the third end 322 of the battery compartment 32. After mounting the battery 323, the end cap 8 is mounted to the third end 322. The end cap 8 is arranged with the press switch 81 to control the light bead 5 and the light string 2 to be switched on and off.

To be noted that, in some embodiments, the light bead sleeve 4 is made of white soft silicone, which is light transmissive but is non-transparent. The light bead sleeve is conical shaped, similar to the flame. By arranging the light bead sleeve 4, the shape of the flame when the real candle is burning can be simulated. The battery 323 is disposed along the axial direction of the battery compartment 32 to fully utilize the space inside the battery compartment 32. After mounting the battery 323 into the battery compartment 32, the end cap 8 is arranged. In this way, the battery 323 is secured, and the end cap 8 is arranged with the press switch 81 to facilitate control from the user.

Figure 10:
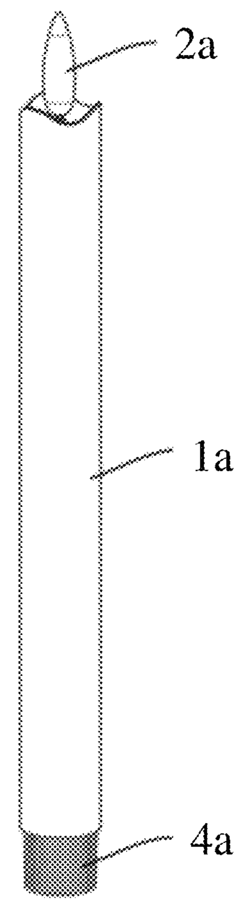
FIG. 10 is a schematic view of an overall structure of the electronic candle according to an embodiment of the present disclosure.
Figure 11:
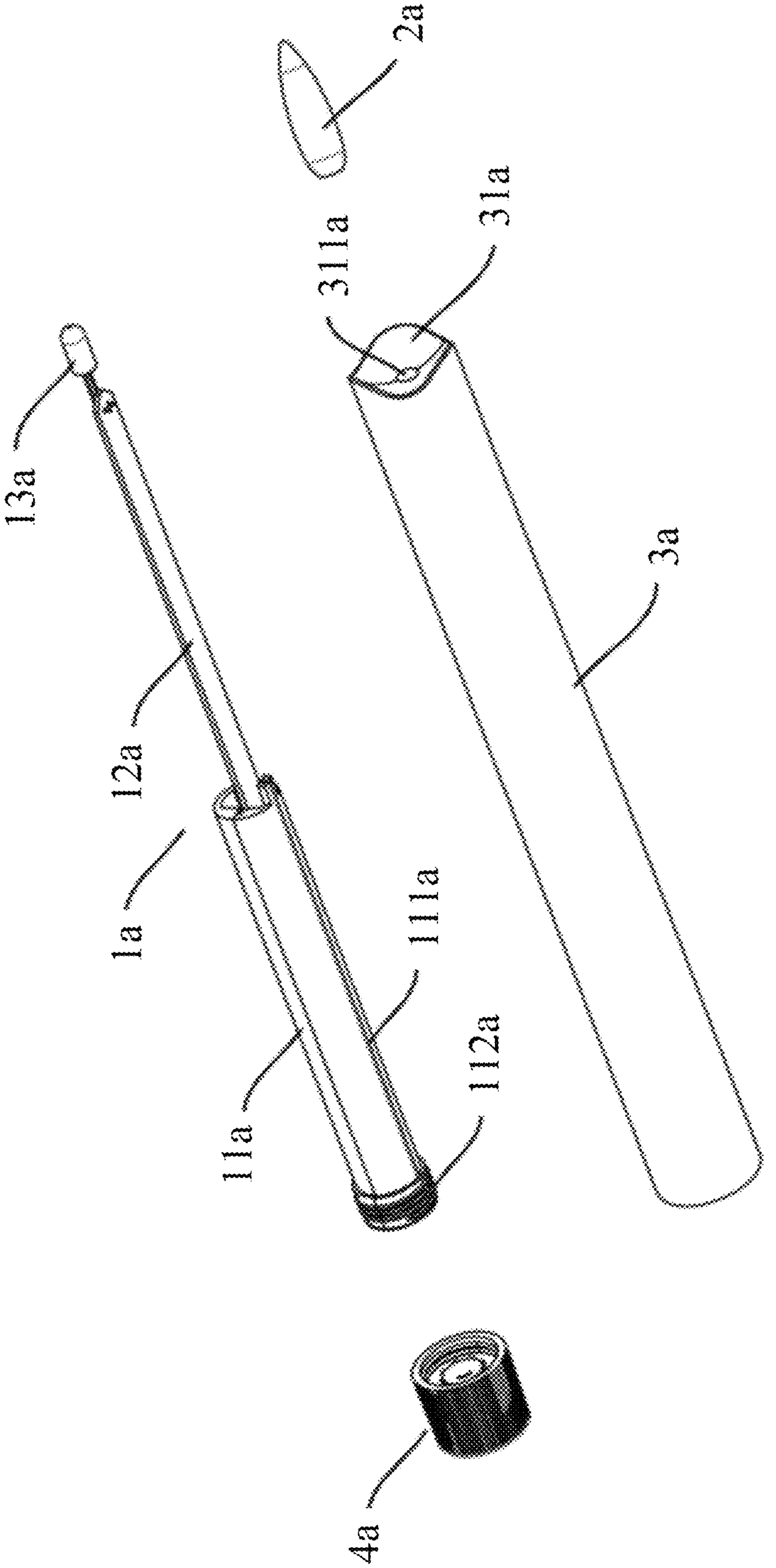
FIG. 11 is an exploded view of the electronic candle according to an embodiment of the present disclosure.
Figure 12:
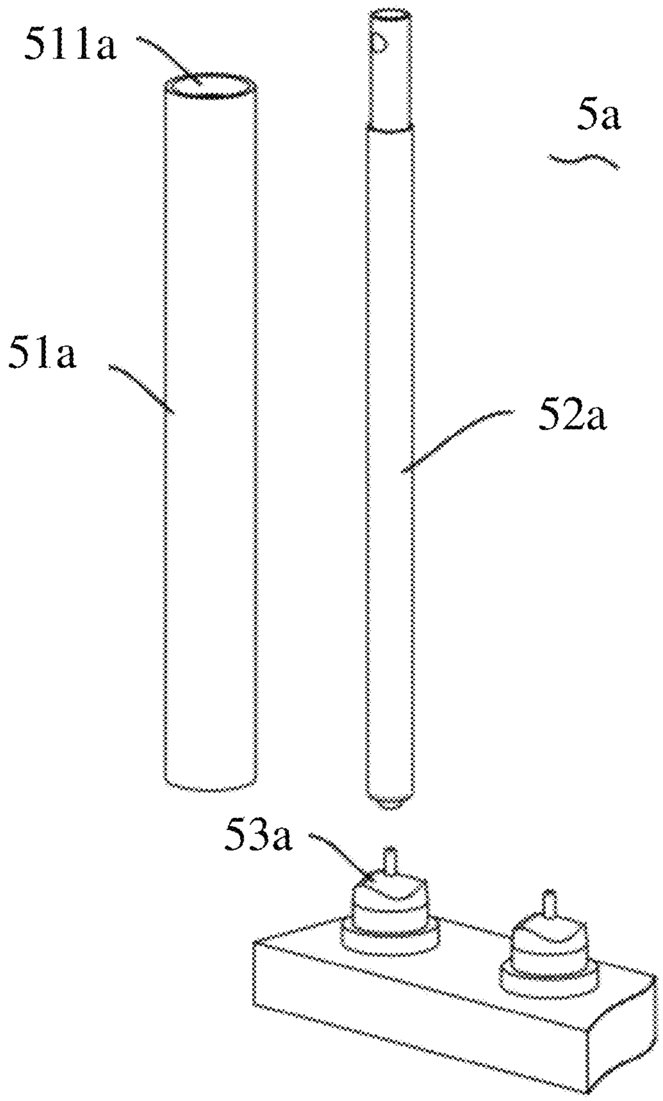
FIG. 12 is an exploded view of the wax filling mold according to an embodiment of the present disclosure.

In the present disclosure, as shown in FIGS. 10 to 12, a long-rod simulated electronic candle and a method for manufacturing the long-rod simulated electronic candle are provided. The long-rod electronic candle may include a core assembly 1*a*, a light bead sleeve 2*a* in a shape of a flame, a wax tube 3*a*, and an end cap 4*a*. The long-rod electronic candle may be produced by a method including the following operations.

In a forming operation of the wax tube 3*a*, a long cylindrical wax tube 3*a* may be produced by a wax filling mold 5*a*. The wax filling mold 5*a* may include an outer mold 51*a* with a tubular groove 511*a*. An inner face for forming the groove 511*a* can be used for forming an outer face of the wax tube 3*a*. An inner mold 52*a* may be detachably fixed along an axial centerline at a bottom end of the groove 511*a*. The inner mold 52*a* may be metal and rod-shaped and may be used for forming an inner face of the wax tube 3*a*. Molten wax solution may be poured to the groove 511*a* between the outer mold 51*a* and the inner mold 52*a*. When the molten wax solution solidifies to a non-flowing state, the inner mold 52*a* may be axially drawn out. After the wax solution is completely shaped, the wax tube 3*a* can be separated from the outer mold 51*a*, and the wax tube 3*a* may be taken out.

In an assembly operation, the core assembly 1*a* may include a battery compartment 11*a* which is tubular, a PCBA board 12*a* which is elongated, and an LED 13*a*. First, the LED 13*a*, serving as the light bead, may be soldered and fixed to a top end of the PCBA board 12*a* by pins, and the PCBA board 12*a* may be electrically connected and vertically fixed to a top end of the battery compartment 11*a*. Then, an entirety of the core assembly 1*a* may be mounted in the wax tube 3*a* from a bottom end of the wax tube 3*a*, so that the wax tube 3*a* may sleeve a periphery of the battery compartment 11*a* and may be fixed to the battery compartment 11*a*, and the LED 13*a* can extend out from a top end of the wax tube 3*a*. Finally, the light bead sleeve 2*a* may be arranged to sleeve a periphery of the LED 13*a* and fixed to the LED 13*a*, and the end cap 4*a* may be assembled and fixed to a bottom end of the battery compartment 11*a*.

In the wax tube 3*a* forming operation, the inner mold 52*a* may be a detachable rod-shaped metal member, which may have good heat conductivity. After absorbing heat of the molten wax solution, the inner mold 52*a* will maintain a certain temperature, which can prevent the wax solution from solidifying prematurely, making the wax solution fill the groove 511*a* uniformly without repeated piercing, thereby resulting in good forming effect and high forming efficiency of the wax tube 3*a*. When the wax solution begins to solidify, the inner mold 52*a* may be drawn out. At this time, the wax solution has a certain plasticity, which can prevent the wax tube 3*a* from cracking due to shaking and squeezing during a demolding process of the inner mold 52*a*. The battery compartment 11*a*, PCBA board 12*a*, and LED 13*a* of the core assembly 1*a* may be assembled as a whole along the axial direction first, and then mounted in the wax tube 3*a* from the bottom end of the wax tube 3*a*. Compared to long-rod candles in related art, an electrical connection and assembly of the PCBA board 12*a*, LED 13*a*, and battery compartment 11*a* may not need to be carried out step by step in a metal or plastic tube. The core assembly 1*a* may be an open assembly, which can greatly improve assembly efficiency. By forming the wax tube 3*a* separately first, and then assembling the core assembly 1*a* in the wax tube 3*a*, technical prejudice of the long-rod candles in the related art that must form a real wax layer by pouring can be overcame. Since no sealing is required, a plastic or metal tube material for sealing the core assembly 1*a* may be omitted, and the core assembly 1*a* may not be scrapped due to poor wax pouring. A comprehensive cost of the product may only be about ⅕ of similar products in the related art, significantly reducing the comprehensive cost of the product.

In this embodiment, the wax tube 3*a* may be arranged with a top end face 31*a*, and the top end face 31*a* may define a through hole 311 for the LED 13*a* to pass through. The wax tube 3*a* may be directly formed with the top end face 31*a*, eliminating a need for the core assembly 1*a* to be arranged with a separate decorative component to be assembled at the top end of the wax tube 3*a*. The through hole 311 can facilitate the LED 13*a* to extend out from inside the wax tube 3*a*. A structure of the top end face 31*a* of the wax tube 3*a* can simplify the product structure and assembly.

In this embodiment, in the wax tube 3*a* forming operation, the top end face 31*a* of the wax tube 3*a* may be a concave curved face simulating a candle burning end. The wax filling mold 5*a* may include a bottom mold 53*a* for forming the top end face 31*a*. The inner mold 52*a* may be detachably inserted in a center of the bottom mold 53*a*. The outer mold 51*a* may be a metal tube. The outer mold 51*a* may be detachably sleeved on a periphery of the bottom mold 53*a*. When the molten wax solution solidifies to the non-flowing state, the inner mold 52*a* may be rotated and axially drawn out. After the wax solution is completely solidified, the outer mold 51*a* may be separated from the bottom mold 53*a*, and then the wax tube 3*a* may be axially separated from the outer mold 51*a*. The outer mold 51*a* being a metal tube may have high thermal conductivity. During a wax pouring process, the metal outer mold 51*a* can absorb the heat of the wax solution, which can keep the wax solution at a certain temperature during pouring, preventing premature solidification of the wax solution and uneven pouring inside the mold. Moreover, the bottom mold 53*a* being detachably cooperated with the outer mold 51*a* can not only facilitate processing of the bottom mold 53*a* for forming a concave curved face, but also facilitate the axial separation between the wax tube 3*a* and the outer mold 51*a*. In addition, the outer mold 51*a* may also not need to be made to a left-right split structure, avoiding mold lines on the wax tube 3*a*. Rotating the inner mold 52*a* and axially drawing the inner mold 52*a* out can prevent deformation of an inner wall of the wax tube 3*a* due to pulling the inner mold 52*a* during rotation, ensuring smoothness of the inner wall of the wax tube 3*a*.

In this embodiment, in the wax tube 3*a* forming operation, the outer mold 51*a* may be preheated before pouring the molten wax solution to the groove 511*a* of the wax filling mold 5*a*. Since the outer mold 51*a* is a metal tube and is preheated, it can ensure that the wax solution may not solidify prematurely during pouring, which would lead to uneven flow. In this way, forming quality and production efficiency of the wax tube 3*a* can be improved.

In this embodiment, in the wax tube 3*a* forming operation, after pouring the molten wax solution to the groove 511*a* of the wax filling mold 5*a*, the outer mold 51*a* may be forcibly cooled by a cooling liquid. Forcible cooling of the outer mold 51*a* after wax pouring can not only shorten a forming time of the wax tube 3*a*, but also make the wax tube 3*a* easier to demold from the outer mold 51*a*.

In this embodiment, the battery compartment 11*a* may be a plastic component. The battery compartment 11*a* may include a left connecting half portion and a right connecting half portion. A bottom end of the PCBA board 12*a* may be clamped between the left connecting half portion and the right connecting half portion and fixed to a top of the battery compartment 11*a*. The use of a plastic component for the battery compartment 11*a*, compared to metal tube battery compartments in the related art, can further reduce a material cost of the product. Moreover, the use of two left and right connecting halve portions can allow for easy clamping and fixing of the PCBA board 12*a*, making the mounting of the PCBA board simple and a structure formed by the PCBA board 12*a* and the battery compartment 11*a* reliable.

In this embodiment, an outer wall of the battery compartment 11*a* may define a recessed wire groove 111*a* which axially extending for holding positive and negative electrical connection wires. Forming the recessed wire groove 111*a* on the outer wall may not affect a connection between the battery compartment 11*a* and the wax tube 3*a*. Moreover, compared to placing the wires on an inner wall of the battery compartment 11*a*, it can prevent poor electrical connection when mounting or replacing batteries.

In this embodiment, a bottom end of an outer peripheral wall of the battery compartment 11*a* may be arranged with a threaded section 112*a* exposed at the bottom end of the wax tube 3*a*. The end cap 4*a* may be connected to the threaded section 112*a* via internal threads. Furthermore, a bottom of the end cap 4*a* may be arranged with a press switch for controlling an electrical connection of the battery compartment 11*a*. The threaded section 112*a* being exposed at an end of the wax tube 3*a* can facilitate an assembly and connection of the battery compartment 11*a* and the wax tube 3*a*, avoiding damage to the wax tube 3*a*. The end cap 4*a*, which also functions as a switch, may not come into contact with the wax tube 3*a* during assembly and disassembly, preventing damage to the wax tube 3*a* during later battery replacement.

To be noted that the above technical features can further continue to be combined with each other to form various embodiments that are not listed in the above, all of which shall be considered to be within the scope of the present disclosure. Any ordinary skilled person in the art may perform improvement or transformation according to the above description, and all of which shall fall within the scope of the appended claims of the present disclosure.

What is claimed is:

1. An electronic candle, comprising:

a wax tube, being cylindrical and made from paraffin wax, wherein, an axial length of the wax tube is 6-15 inches, a diameter of the wax tube is 19 mm-25 mm, the wax tube defines a cavity at an interior thereof, the wax tube has a first end and a second end, the second end defines an opening communicated to the cavity;

a battery compartment, wherein, the battery compartment is inserted into the cavity from the second end, the battery compartment has a third end and a fourth end, the fourth end defines an opening facing towards the first end of the wax tube; and a printed circuit board assembly (PCBA), inserted to the fourth end of the battery compartment;

wherein, the PCBA is elongated; a maximum width of the PCBA is in an interference fit with an inner diameter of the battery compartment, enabling the PCBA to be snapped with the battery compartment.

2. The electronic candle according to claim 1, wherein, at least a portion of the PCBA is exposed to the cavity of the wax tube, and each of two sides of the PCBA is arranged with a bump to form the maximum width.

3. The electronic candle according to claim 1, wherein, an end of the PCBA away from the battery compartment is connected with a light bead; an end face of the first end of the wax tube defines a through hole; the light bead passes through the through hole to be exposed out of the wax tube.

4. The electronic candle according to claim 1, further comprising a battery, received in the battery compartment and coaxially arranged with the battery compartment; wherein, the battery is electrically connected to the PCBA.

5. The electronic candle according to claim 3, further comprising a light bead sleeve, wherein, the light bead sleeve is light transmissive and sleeves the light bead; the light bead sleeve is conical, having a shape to simulate a flame.

6. The electronic candle according to claim 5, wherein, light emitted from the light bead is warm white light to simulate the flame.

7. The electronic candle according to claim 1, wherein, an edge of an opening of the first end of the wax tube is wavy, flat or inclined.

8. The electronic candle according to claim 1, further comprising a light string, wherein, the light string is arranged on an outer surface of the wax tube and extends through the wax tube to be electrically connected to the exposed portion of the PCBA.

9. The electronic candle according to claim 8, wherein, the light string is extending to form a crossing pattern and winds along an axial direction of the wax tube, and the light string is disposed on the outer surface of the wax tube.

10. The electronic candle according to claim 8, wherein, the light string is extending spirally, winding along an axial direction of the wax tube, to be arranged on the outer surface of the wax tube.

11. The electronic candle according to claim 8, wherein, the wax tube defines a receiving groove, an extending shape of the receiving groove matches with an extending path of the light string, the receiving groove receives the light string.

12. The electronic candle according to claim 11, wherein, an outer surface of the light string flushed with the outer surface of the wax tube.

13. The electronic candle according to claim 8, wherein, the light string comprises a wire and a plurality of LED lights arranged on the wire, and the plurality of LED lights are spaced apart from each other.

14. The electronic candle according to claim 5, further comprising an end cap, the third end of the battery compartment is convex to form a connection structure; the connection structure comprises an abutting surface; the abutting surface abuts against an end surface of the second end of the wax tube; the connection structure is exposed out of the wax tube; the end cap is connected to the connection structure.

15. The electronic candle according to claim 14, further comprising a light string, wherein, the light string extends spirally and is arranged on an outer surface of the wax tube, the end cap is arranged with a press switch to control the light bead and the light string to be switched on and off.

16. The electronic candle according to claim 14, wherein, the end cap and the connection structure are connected to each other by threading.

17. The electronic candle according to claim 1, wherein, the battery compartment is a plastic member; and the battery compartment is assembled to the wax tube by an adhesive.

18. An electronic candle, comprising:

a wax tube, being cylindrical and made from paraffin wax, wherein, an axial length of the wax tube is 6-15 inches, a diameter of the wax tube is 19 mm-25 mm, the wax tube defines a cavity at an interior thereof, the wax tube has a first end and a second end, the second end defines an opening communicated to the cavity;

a battery compartment, wherein, the battery compartment is inserted into the cavity from the second end, the battery compartment has a third end and a fourth end, the fourth end defines an opening facing towards the first end of the wax tube; and a printed circuit board assembly (PCBA), inserted to the fourth end of the battery compartment; and an end cap, wherein, the third end of the battery compartment is convex to form a connection structure; the connection structure comprises an abutting surface; the abutting surface abuts against an end surface of the second end of the wax tube; the connection structure is exposed out of the wax tube; the end cap is connected to the connection structure.

19. The electronic candle according to claim 18, further comprising a light string, wherein, the light string is arranged on an outer surface of the wax tube and electrically connected to the PCBA, an end of the PCBA away from the battery compartment is connected with a light bead, and the end cap is arranged with a press switch to control the light bead and the light string to be switched on and off.

20. The electronic candle according to claim 18, wherein, at least a portion of the PCBA is exposed to the cavity of the wax tube, and the end cap and the connection structure are connected to each other by threading.

* * * * *